H. W. RICE.

Steam-Boiler.

No. 6,422. Reissued May 4, 1875.

Witnesses

Geo. H. Strong.

Jno. L. Boone

Inventor

Harvey Wood Rice by Dewey & Co

Attys

UNITED STATES PATENT OFFICE.

HARVEY W. RICE, OF HAYWOOD, CALIFORNIA.

IMPROVEMENT IN STEAM-BOILERS.

Specification forming part of Letters Patent No. 146,614, dated January 20, 1874; reissue No. 6,422, dated May 4, 1875; application filed March 17, 1875.

*To all whom it may concern:*

Be it known that I, HARVEY WOOD RICE, of Haywood, Alameda county, State of California, have invented new and useful Improvements in Steam-Boilers; and I do hereby declare the following description and accompanying drawing are sufficient to enable any person skilled in the art or science to which it most nearly appertains to make and use my said invention without further invention or experiment.

My invention relates to the combination of a straw-feeding device with the furnace-door of that class of boilers which are known as return-flue boilers, by which combination I am able to provide a superior arrangement for utilizing straw as a fuel for generating steam.

Many attempts have heretofore been made both in this country and in Europe to successfully utilize straw as a fuel for generating steam in steam-boilers; but these attempts have always resulted in failures or partial failures.

When straw is fed into the furnace of an ordinary steam-boiler, it burns too quickly to do much good in heating the water in the boiler, until a sufficient quantity of cinders accumulates upon the grate-bars to impede the draft; and unless the cinders are frequently removed from between the grate-bars they soon accumulate to such an extent as to choke the draft entirely and prevent combustion.

Many devices have been tried and patented for overcoming these troubles; but, as far as I am aware, none of them have succeeded in remedying the difficulties sufficiently to make the straw-burning engine a practical success.

My experiments, however, have developed the fact that, by attaching a tube or box-door to the furnaces of that class of boilers known as return-flue boilers, in which the chimney or stack is constructed directly above the furnace, and the heat and products of combustion from the furnace are carried along under the boiler, and then returned back to the stack through flues or tubes leading through the length of the boiler, the combustion will be so complete that no sparks, and but very little smoke, will escape from the chimney, and the straw will be burned freely, giving out a high degree of heat without danger of choking the grate-bars.

My invention also relates to a novel method of securing the tubes and tube-sheet within the shell of the boiler, so that they can be at any time easily removed for the purpose of cleaning or repairing, and at a much less expense than is ordinarily entailed for such work.

Figure 1:
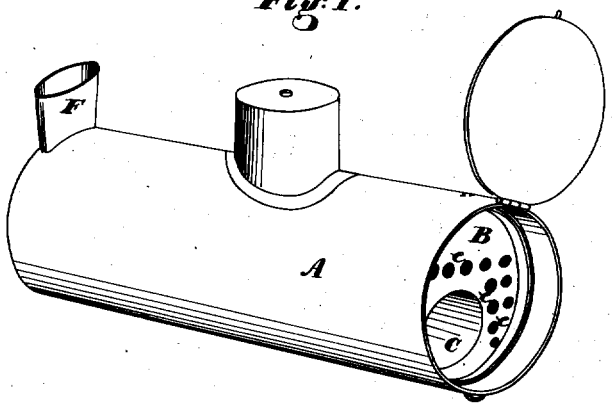
Figure 2:
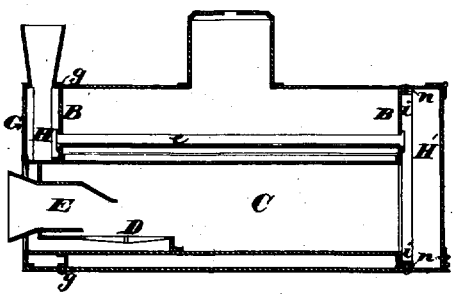
Figure 3:
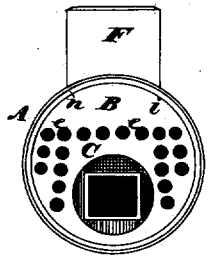
Figure 4:
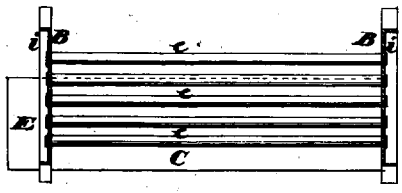
Figure 5:
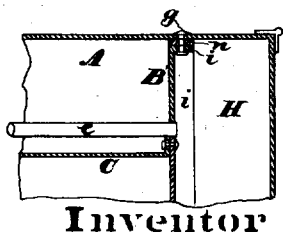

Referring to the accompanying drawings for a more complete explanation of my invention, Figure 1 is a perspective view of my boiler from the rear end. Fig. 2 is a sectional elevation. Fig. 3 is a rear-end view with cap removed. Fig. 4 is a view of tubes and sheet. Fig. 5 is an enlarged view, showing the manner of securing the tube-sheet in the shell.

A is the shell of my boiler, which is more especially intended to be used for that class of engines employed in thrashing and other field work where there is straw or other light material enough for fuel, but which has never been satisfactorily burned without an artificial draft or blast, and which has always been dangerous, by reason of the sparks thrown out on account of incomplete combustion.

In order to remedy these faults, and perfectly consume all the smoke and sparks, I perforate my tube-sheet B B, so as to admit one large furnace, C, near the bottom, which receives the fuel upon a grate, D, and acts at the same time as a tube and fire-box. To the door of the furnace C I attach a straw-feeding tube, E, through which the straw or other light fuel is fed to the furnaces.

This tube can be constructed in the manner described by David Morey in his patents dated February 11, 1873, and May 25, 1872, for straw-feeding attachment for furnaces, or in some other suitable manner for feeding the straw without admitting a draft of air.

Above and around the sides of the large furnace C I place small or locomotive-boiler tubes *e e*, as shown, and these serve to return the heat and the products of combustion to the chimney F, which is located at the front end of the boiler, and communicates with the chamber H, formed between the flue-sheet and the head or door G. A similar chamber, H′, is formed at the back end of the boiler, into which the products of combustion pass from the large furnace C before entering the return-flues *e*.

By this construction the light fuel is thoroughly ignited in its passage through the large tube, which has plenty of air admitted for the purpose. The heat and flame will be concentrated in returning through the small flues, and the combustion will be so complete that no sparks, and but very little smoke, will escape from the chimney, and this latter will not even need a bonnet.

The tube-sheets B B are made with a flange, *i*, which is turned outward, and these flanges are pierced, so as to admit screw-bolts or rivets *g*, as may be preferred. These bolts secure the tube-sheets in their places perfectly steam and water tight.

Whenever, by reason of long use, there is a collection of scale or sediment, or if the tubes or the interior of the boiler need repairing, the screw-bolts can be removed; or if rivets are used, they can be cut off, when the two tube-sheets, with the tubes, can be removed from the shell in a body, and repairs or cleaning can be easily effected, with much less time and trouble than when the boilers are made in the ordinary manner.

The flange on the rear tube-sheet is turned so much smaller than the interior of the shell that an iron ring, *n*, can be introduced between it and the shell, the bolt passing through it.

When it is necessary to remove the tubes and sheets, this ring can be taken out after removing the nuts and rivets, and this leaves the rear tube-sheet small enough to pass any rivets or obstructions freely when taking it out.

By this construction I am enabled to make a boiler and furnace in which straw can be used as a fuel with perfect safety, and in which repairs can be easily effected.

Having thus described my invention, what I claim, and desire to secure by Letters Patent, is—

1. The boiler A, having the furnace C, grate D, return flues or tubes *e e*, and stack or chimney B, arranged as described, in combination with the straw-feeding furnace-door attachment, substantially as and for the purpose described.

2. In a horizontal steam-boiler, the furnace C, formed with a grate, D, to serve as a fire-place, in combination with small return-flues *e e*, when the tubes and tube-sheets are secured by flanges *i* and bolts *g*, so as to be removable from the shell in a body, substantially as and for the purpose described.

In witness whereof I hereunto set my hand and seal.

HARVEY W. RICE.

Witnesses:
JNO. L. BOONE,
GEO. H. STRONG.